United States Patent
Lustig et al.

(10) Patent No.: US 11,736,041 B2
(45) Date of Patent: Aug. 22, 2023

(54) SUSPENSION ASSEMBLY

(71) Applicant: Aktiebolaget SKF, Gothenburg (SE)

(72) Inventors: Maarten Lustig, Delft (NL); Sjoerd Van Bracht, Delft (NL); Wout Ypma, Delft (NL)

(73) Assignee: Aktiebolaget SKF, Gothenburg (SE)

( * ) Notice: Subject to any disclaimer, the term of this patent is extended or adjusted under 35 U.S.C. 154(b) by 700 days.

(21) Appl. No.: 16/728,395

(22) Filed: Dec. 27, 2019

(65) Prior Publication Data
US 2020/0220483 A1    Jul. 9, 2020

(30) Foreign Application Priority Data
Jan. 4, 2019    (DE) .......................... 102019200049.5

(51) Int. Cl.
| | | |
|---|---|---|
| H02N 2/18 | (2006.01) | |
| F16F 1/02 | (2006.01) | |
| F16F 15/02 | (2006.01) | |
| H02J 50/00 | (2016.01) | |

(52) U.S. Cl.
CPC ............. H02N 2/186 (2013.01); F16F 1/027 (2013.01); F16F 15/02 (2013.01); H02J 50/001 (2020.01); F16F 2228/08 (2013.01); H02N 2/181 (2013.01)

(58) Field of Classification Search
CPC ....... H02N 2/186; H02N 2/181; H02J 50/001; F16F 1/027; F16F 15/02; F16F 2228/08
See application file for complete search history.

(56) References Cited

U.S. PATENT DOCUMENTS

| | | | |
|---|---|---|---|
| 3,389,902 A | 6/1968 | Young | |
| 4,102,586 A | 7/1978 | Pearson et al. | |
| 4,887,802 A | 12/1989 | Wilcox | |
| 5,006,681 A | 4/1991 | Postmus et al. | |
| 5,113,047 A | 5/1992 | Tsutsumi | |
| 7,692,366 B2 * | 4/2010 | Thiesen ............. | H01L 41/1134 310/339 |
| 10,805,718 B1 * | 10/2020 | Porter ..................... | F16F 1/021 |
| 11,166,096 B1 * | 11/2021 | Porter .................. | H04R 1/2896 |
| 2002/0118492 A1 | 8/2002 | Watanabe et al. | |
| 2005/0035687 A1 | 2/2005 | Xu et al. | |

(Continued)

FOREIGN PATENT DOCUMENTS

| | | |
|---|---|---|
| CN | 201331399 Y | 10/2009 |
| CN | 103999348 A | 8/2014 |

(Continued)

OTHER PUBLICATIONS

Guangcan Xu et al., "Energy Regenerative Suspension and Its Performance Optimization for Electric Vehicle," Journal of Xi'an Jiaotong University, Aug. 2016, pp. 90-95, vol. 50, No. 8, Xi'an 710049, China.

*Primary Examiner* — Thomas W Irvin
(74) *Attorney, Agent, or Firm* — Garcia-Zamor Intellectual Property Law, LLC; Ruy Garcia-Zamor (57) ABSTRACT

A suspension assembly provides a suspension frame and a supporting frame, the suspension frame being movably coupled to the supporting frame. The suspension assembly further provides at least one flexure that links the suspension frame to the supporting frame. The suspension assembly including at least one stopper to limit movement of the supporting frame and the suspension frame with respect to each other.

9 Claims, 6 Drawing Sheets

(56) References Cited

U.S. PATENT DOCUMENTS

| | | |
|---|---|---|
| 2007/0121062 A1 | 5/2007 | Habermann |
| 2008/0136292 A1 | 6/2008 | Thiesen |
| 2010/0122461 A1 | 5/2010 | Minas et al. |
| 2010/0270889 A1 | 10/2010 | Xu et al. |
| 2010/0270899 A1 | 10/2010 | Perner |
| 2014/0117785 A1 | 5/2014 | Furukawa et al. |
| 2015/0145376 A1 | 5/2015 | Sun et al. |
| 2015/0180374 A1 | 6/2015 | Herder et al. |
| 2015/0188389 A1 | 7/2015 | Wan et al. |
| 2017/0027587 A1 | 2/2017 | Fraone et al. |
| 2017/0373611 A1 | 12/2017 | Cottone et al. |
| 2020/0220383 A1 | 7/2020 | Lustig et al. |
| 2021/0044221 A1 * | 2/2021 | Jia ..................... H02N 2/186 |
| 2021/0058011 A1 * | 2/2021 | Seshia ............... H02K 7/1876 |

FOREIGN PATENT DOCUMENTS

| | | | |
|---|---|---|---|
| CN | 106195106 A | 12/2016 | |
| CN | 107395063 A | 11/2017 | |
| CN | 107681920 A | 2/2018 | |
| CN | 107707155 A | 2/2018 | |
| CN | 108011543 A | 5/2018 | |
| EP | 2489288 A1 | 8/2012 | |
| FR | 2675557 A1 | 10/1992 | |
| GB | 2576686 B | 6/2022 | |
| KR | 20140140378 A | 12/2014 | |
| WO | 2006059098 A1 | 6/2006 | |
| WO | WO-2006059098 A1 * | 6/2006 | ............ F16F 1/027 |
| WO | 2007119981 A | 9/2007 | |
| WO | 2017086785 A1 | 5/2017 | |

* cited by examiner

SUSPENSION ASSEMBLY

CROSS-REFERENCE TO RELATED APPLICATIONS

This application claims priority to German patent application no. 102019200049.5 filed on Jan. 4, 2019, the contents of which are fully incorporated herein by reference.

TECHNICAL FIELD

The invention concerns suspension assemblies and is more particularly directed to suspension assemblies for vibration energy harvesters.

BACKGROUND OF THE INVENTION

More and more machine parts are being monitored to determine a condition of the machine part. The monitoring is usually done with one or more sensors to measure one or more physical parameters and transduce these physical parameters into electrical signals, which signals are possibly signal processed. To get these signals as raw data, preprocessed data, or just an indication of the condition of the machine part to a suitable place such as a control room or the like, there will be some sort of communication unit. In most cases the communication unit will transfer the information wirelessly. In many of the locations where there is a desire to perform condition monitoring there is no power easily available. A battery then becomes necessary, or if a long-term maintenance-free sensor unit is desired, then some kind of energy harvester becomes necessary.

Energy harvesting can be done in many different manners. Solar cell will in many cases not work as the machine part that it is desired to monitor is most likely in an enclosed space, such as a building. Vibration energy harvesters will work in any environment, light or dark, as long as there are vibrations available. Since condition monitoring is often done on rotating machine parts, such as shaft and bearings, vibrations are available. US2015/0180374 and WO2017/086785 describe vibration energy harvesters. In theory a vibration energy harvester will produce energy as long as there are vibrations, however a vibration energy harvester comprises moving parts and these moving parts can degrade quickly in very harsh environments with vibrations up to 100 g, such as for example condition monitoring of train bearings and axels. At the same time it is desirable that the condition monitoring equipment does not require maintenance more often than the machine part that they monitor requires. There is still room for improvements.

SUMMARY OF THE INVENTION

An object of the invention is to define a suspension assembly, and an energy harvester comprising such a suspension assembly, for harsh environments where high g-forces are present.

The aforementioned object is achieved by, a suspension assembly comprising a flexure, and a vibration energy harvester comprising such a suspension assembly. Advantages embodiments are described in dependent claims.

The suspension assembly comprises a suspension frame being movably coupled to a supporting frame in such a way that the suspension frame is movable in relation to the supporting frame in a major direction of movement. The suspension frame is movably coupled to the supporting frame by at least one flexure or spring (the terms flexure and spring are used as synonyms in the following) e.g. in the embodiment as one or more ortho-planar springs. To limit the amount of stress the spring or springs could be subjected to, the suspension frame comprises one or more stoppers that during use mate with one or more stoppers that the supporting frame comprises. Thereby the mating stoppers on the suspension and the supporting frame are designed the way, that a defined movement of the suspension frame in relation to the supporting frame is enabled under normal vibration conditions, but that this movement is limited in case of excessive, extreme and/or shock-load-like vibration conditions to avoid overstressing of the flexures. Thereby it is just one possibility that the mating stoppers are formed such that during use the distance between them stay approximately the same when the suspension frame moves undisturbed (i.e. under normal vibration conditions) in relation to the supporting frame in the major direction of movement. The suspension assembly comprising a flexure, and the vibration energy harvester comprising such a suspension assembly, are suitable for long term usage in harsh vibrational environments.

The aforementioned object is further achieved according to the invention by a suspension assembly comprising a suspension frame and a supporting frame. The suspension frame is movably coupled to the supporting frame in such a way that the suspension frame is movable in relation to the supporting frame. According to the invention the suspension assembly further comprises at least one ortho-planar spring, and the suspension frame is movably coupled to the supporting frame by means of the at least one ortho-planar spring. The supporting frame comprises at least one stopper and the suspension frame comprises at least one stopper, and in that during use over an operating range of relative movement between the supporting frame and the suspension frame the at least one suspension frame stopper mates with the at least one supporting frame stopper and mated stoppers are designed the way, that a defined movement of the suspension frame in relation to the supporting frame is enabled under normal vibration conditions of the operating range, but that this movement is limited in case of excessive, extreme and/or shock-load-like vibration conditions. This is to limit stresses induced into the at least one ortho-planar spring when the suspension assembly is subjected to damaging acceleration.

Suitably the at least one stopper of the suspension frame is either a larger surface, one or more contact points, one or more contact areas where each area is smaller than an area of larger surface, or one or more contact line sections. The at least one stopper of the supporting frame is suitably either a larger surface, one or more contact points, one or more contact areas where each area is smaller than an area of larger surface, or one or more contact line sections. The type of stopper for each can is best chosen to best match the other. A surface matches easily with all.

In some embodiments the at least one stopper of the supporting frame and the at least one stopper of the suspension frame are surfaces. Suitably the stopper surfaces are sloped surfaces. Alternatively the stopper surfaces are curved surfaces. Just in one possible embodiment they are angled or curved such that during use over an operating range of relative movement between the supporting frame and the suspension frame, a distance between each pair of mating curved surfaces stays substantially the same. However when subjected to severe shocks and extreme vibrations, the mating stopper will collide and the suspension assembly will momentarily stop operating. However, since the operating distance between mating stoppers due to their design is very small, in the magnitude of 0.1 mm, the springs/flexures are only subjected to a limited amount of stress.

In some embodiments, the one or more ortho-planar springs have a thickness, a width and a length, the thickness being at least one order of magnitude smaller than either the length or the width, the length of the springs is larger than the width of the springs. The springs further have across their width a first end and a second end. The first end and the second end being located at opposite ends along the length of the springs, and wherein the springs comprise three areas. A first connection area at the first end of the springs spanning across the width of the springs and along a part of the length of the springs from the first end of the springs. A second connection area at the second end of the springs spanning across the width of the springs and along a part of the length of the springs from the second end. And a spring area being substantially rectangular spanning across the width of the springs and along the length of the springs between the first connection area and the second connection area. The spring area comprises at least one slot having a first endpoint and a second endpoint. The at least one slot runs along the length of each of the springs in such a way that each one of the springs are in one piece.

Suitably the first endpoint enters into the first connection area and/or the second endpoint enters into the second connection area of at least one of the at least one slots. Advantageously the at least one of the at least one slot is straight at least within the spring areas. Preferably a width of at least one of the at least one slot is constant at least within the spring area. Suitably the width of the springs are constant at least within the spring area.

In some embodiments of the invention, the ortho-planar springs are made of a metallic material.

The different additional enhancements of the suspension assembly according to the invention can be combined in any desired manner as long as no conflicting features are combined.

The aforementioned object is also achieved according to the invention by a vibration energy harvester comprising a suspension assembly with a coil that will in use move in relation to a magnetic field due to vibrations that the suspension assembly is subjected to. The harvester further comprises an electronics unit that is coupled to the coil and that comprises means to regulate and store energy generated by the coil moving in the magnetic field. The electronics unit suitably comprises a protective circuit means to protect the coil and the electronics unit. The harvester also comprises an output means to thereby be able to supply energy from the energy harvester to an energy consumer. According to the invention the suspension assembly is a suspension assembly according to any one of the suspension assemblies described above. Further there are magnets located fixed in relation to the supporting frame of the suspension assembly.

A primary purpose of the invention is to provide a suspension assembly with one or more flexures and an energy harvester comprising such a suspension assembly, having a long expected life, even in harsh environments. This is achieved by use of ortho-planar springs, flexures, that are in one piece that can be easily mountable and still having low-stress levels when subjected to shear forces. This is obtained by creating parallel springs by adding one or more slots. To limit the amount of stress that the flexures are subjected to, the suspension frame comprises one or more stoppers that during use mate with one or more stoppers that the supporting frame comprises. Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION OF THE INVENTION

In order to clarify the method and device according to the invention, some examples of its use will now be described in connection with FIGS. 1 to 5.

Figure 1:
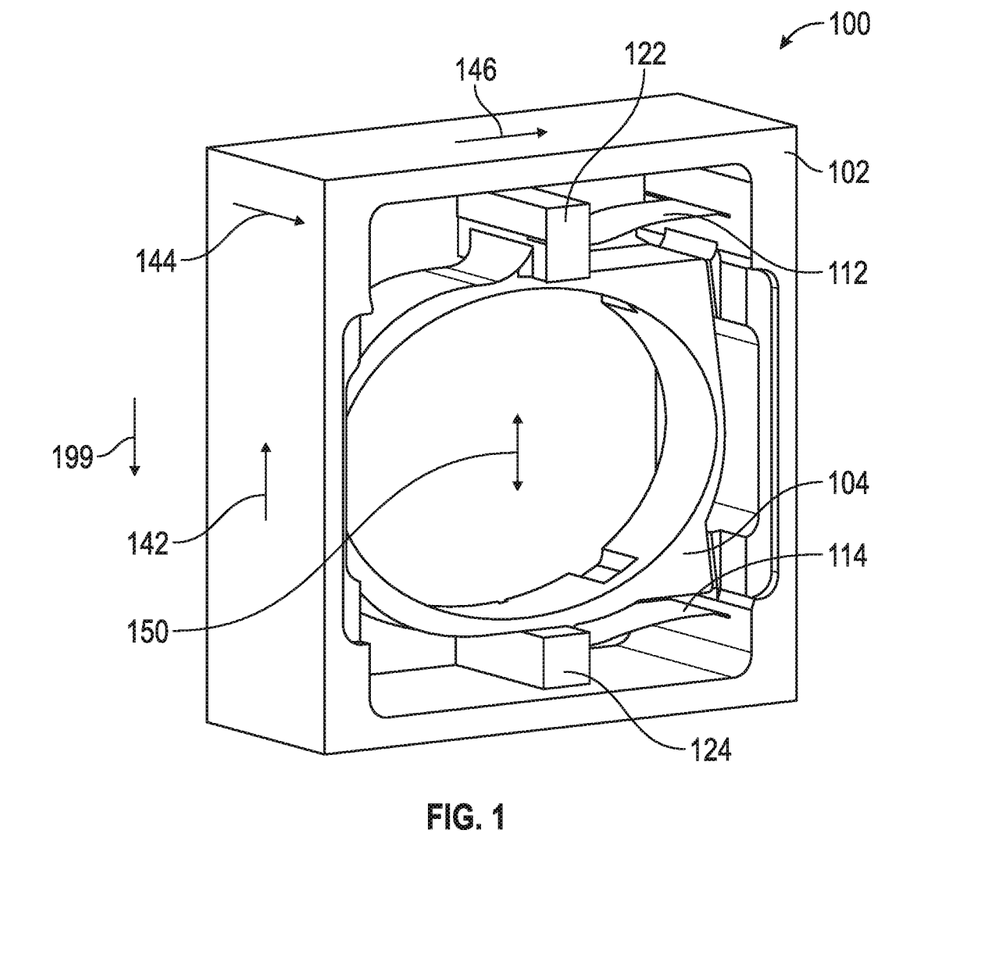
FIG. 1 illustrates an isometric view of a suspension assembly where flexures/springs according to the invention are suitably mounted as suspension springs.

FIG. 1 illustrates an isometric view of a suspension assembly 100 where flexures/springs according to the invention are suitably mounted as suspension springs 112, 114. The suspension assembly 100 comprises a supporting frame 102 and a suspension frame 104. The suspension frame 104 is suspended in the supporting frame 102 by means of one or more suspension springs/flexures 112, 114. There are suitably at least two ortho-planar springs 112, 114 to restrict movement 150 of the suspension frame 102 to a vertical direction 142 as much as possible. The illustrated suspension assembly 100 is intended to be used in a vibration energy harvester, which would then also comprise a wound coil in the suspension frame and magnets on either side of the supporting frame 102, creating a moving 150 coil in a magnetic field. When in use the supporting frame 102 is aligned with gravity 199 such that the suspension frame 104 can move 150 relative to the supporting frame 102 when there are vibrations in the vertical direction 142.

In a preferred situation the characteristics of the suspension springs 112, 114, in relation to the total weight of the suspension frame 104 with a coil, are such that when in rest, the suspension frame 104 attains a neutral position such that within the restrictions of two stoppers 122, 124 it can move 150. When the supporting frame 102 is subjected to vibrations in the vertical direction 142, the supporting frame 102 with the magnets will move with the vibrations and due to the characteristics of the suspension springs 112, 114, the suspension frame 104 will react dynamically to said vibrations, creating a relative movement between the coil and the magnets. The stoppers 122, 124, here illustrated as being part of, or attached to, the suspension frame 104 can of course also be wholly or in part being part of, or attached to, the supporting frame 102. The stoppers 122, 124 are to restrict the vertical 142 movement 150 of the suspension frame 104 in relation to the supporting frame 102 when vibrations or shock waves in the vertical direction 142 becomes so large that the suspension springs 112, 114 would be subjected to damaging stresses. In this embodiment the stoppers have a second use of being the connection/clamping points of the suspension springs 112, 114 onto the suspension frame 104.

Ideally vibrations would only appear in the vertical direction 142. However, vibrations and shock waves might also appear in a longitudinal direction 144 and a transverse direction 146, especially in harsh environments such as being mounted on a freight railway bearing. The suspension frame 104 will to some degree restrict movement of itself in the longitudinal direction 144, but there must be a balance between restricting movement in the longitudinal direction 144 and the play needed between the coil and the magnets to not restrict movement 150 in the vertical direction 142.

The longitudinal direction 144 relative movement between the suspension frame 104 and the supporting frame 102 causes extremely harmful shear forces on the suspension springs 112, 114 resulting in high-stress levels that cause material fatigue. A high amount of cycles at high-stress levels will degrade the performance of the suspension springs 112, 114 and eventually cause them to break. Any vibrations or shock waves in the transversal direction 146 are being restricted by only a play existing between the supporting frame 102 and the suspension frame 104. Even though the play might be small, if the shock waves and vibrations in the transverse direction 146 are large and frequent, they can cause severe damage to the suspension springs 112, 114 due to being subjected to high-stress levels.

Figure 2:
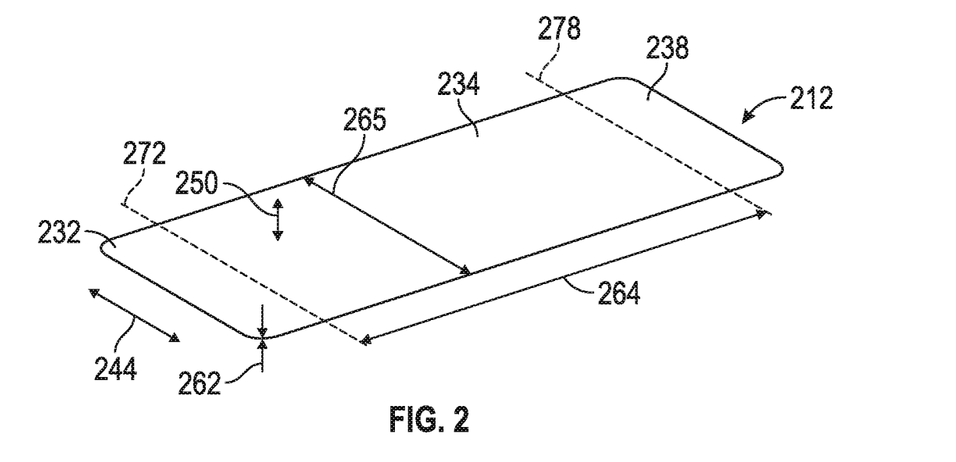
FIG. 2 illustrates an isometric view of a flexure/spring.

FIG. 2 illustrates an isometric view of an ortho-planar flexure/spring 212. The flexure 212 is a flat piece that is divided into three areas as divided by two lines 272, 278. There is a first connection/clamping area 232, a spring 212 area 234, and a second connection/clamping area 238. Only the spring 212 area 234 functions as a spring and the characteristics of it depends on the length 264, width 265, thickness 262, and the material it is made of. The material is most commonly a metal, such as spring steel. The two connection/clamping areas 232, 238 are for connection and they are assumed for this illustration to be clamped stiff at the connection points up to each respective line 272, 278 across the width 265 of the flexure 212. In use, in a suspension assembly according to FIG. 1, one flexure 212 will be used for each of the two suspension springs 112, 114. For the sake of this description, it is chosen that for each flexure 212 the connection/clamping area 238 is clamped into the supporting frame 102 and the connection/clamping area 232 is clamped into the suspension frame 104. It can be the other way around since the flexure is the same in relation to both sides. The end of each flexure 212 that is clamped to the supporting frame 102, will be fixed in relation to the supporting frame 102. The end of each flexure 212 that is clamped to the suspension frame 104 will move 250 together with the suspension frame 104.

As mentioned above, vibrations and shock waves in the longitudinal direction 244, can cause problems, especially in harsh environments such as train applications, where shock waves up to a 100 g can appear, and thereby causing enormous shear stresses on the flexure 212. This can result in fatigue of the flexure 212, resulting in a limited usable life of the flexure 112 and thus of the suspension assembly 100 and of a vibration energy harvester comprising these components.

Figure 3:
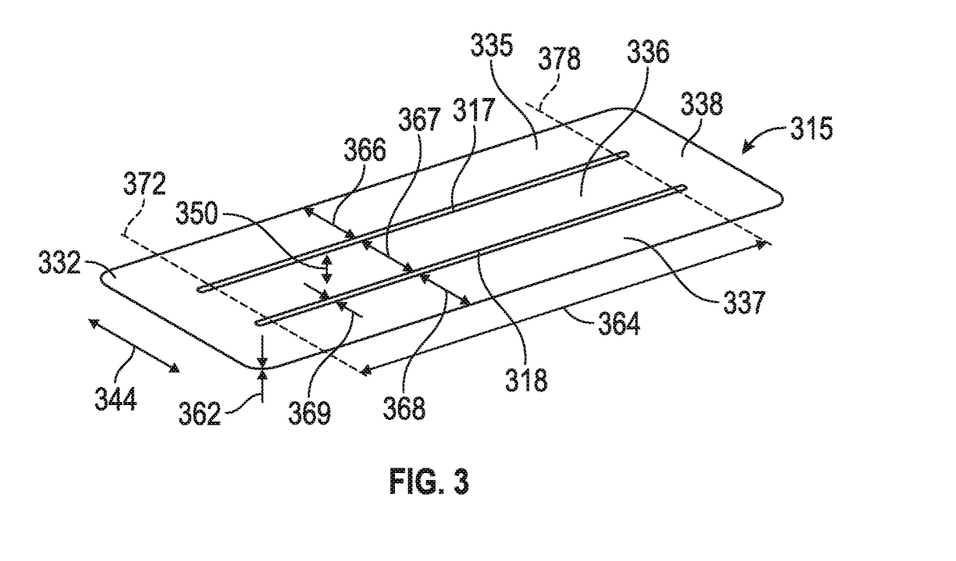
FIG. 3 illustrates an isometric view of a flexure/spring according to the invention.

FIG. 3 illustrates an isometric view of an ortho-planar flexure/spring 315 according to the invention. The flexure 315 according to the invention comprises one or more parallel straight slots, in the illustrated embodiment there are two parallel straight slots 317, 318 evenly distributed. In other embodiments, one or more of the slots can be non-straight, such as wavy or curved. In still other embodiments the one or more slots are not evenly distributed, giving each of the springs different characteristics.

The flexure 315 is in this embodiment divided into five different areas as divided by two lines 372, 378, and the two slots 317, 318. The five areas comprise a first connection/clamping area 332, three spring areas 335, 336, 337, and a second connection/clamping area 338. The straight slots 317, 318 will cross the two lines 372, 378 and enter into the connection/clamping areas 332, 338. When in use, ends of the straight slots 317, 318 will not be visible and in this embodiment, it will look like there are three independent ortho-planar flexures/springs. In other embodiments, the one or more slots will not cross one or both of the two lines 372, 378, creating a combination of serial and parallel springs. Only the spring 315 areas 335, 336, 337 function as springs and the characteristics of them depend on the length 364, width of each respective one 366, 367, 368, thickness 362, and the material it is made of. The width of each slot can be constant or varying. The material is most commonly a metal, such as spring steel.

The three spring areas 335, 336, 337 act as a set of three parallel springs. The number of parallel springs can be just two with having just one slot, or there can be more parallel springs by introducing more straight slots. By having parallel springs, there will be a reduced stress on each one of the springs in comparison to the ortho-planar flexure/spring as illustrated in FIG. 2. When there are vibrations or shock waves in the shear direction 344 of the flexure 315 there is a significantly reduced stress as in that direction the stress as the second moments of area is reduced significantly. This will result in a longer life expectancy of the flexure in relation to having a flexure according to FIG. 2. One way of attaining the same characteristic in the motion direction 350 as the flexure of FIG. 2, with the thickness 362 being the same, then the spring areas should also be the same, that is the flexure 315 can for example be wider by the added widths 369 of all the slots 317, 318.

A big advantage is also that the flexure is still a single piece, which enables the assembly to be done as a single flexure, but it acts after assembly as a set of multiple parallel springs.

The two connection/clamping areas 332, 338 are for connection and they are assumed for this illustration to be clamped stiff at the connection points up to each respective line 372, 378 across the width of the flexure 315, creating three independent parallel springs. In use, in a suspension assembly according to FIG. 1, a flexure 315 will be used for each of the two suspension springs 112, 114.

For this embodiment it is chosen that for each flexure 315 the connection/clamping area 338 is clamped into the supporting frame 102 and the connection/clamping area 332 is clamped into the suspension frame 104. It can be the other way around since the flexure is the same seen from either side. The end of each flexure 315 that is clamped to the supporting frame 102, will be fixed in relation to the supporting frame 102. The end of each flexure 315 that is clamped to the suspension frame 104 will move 350 together with the suspension frame 104.

Figure 4:
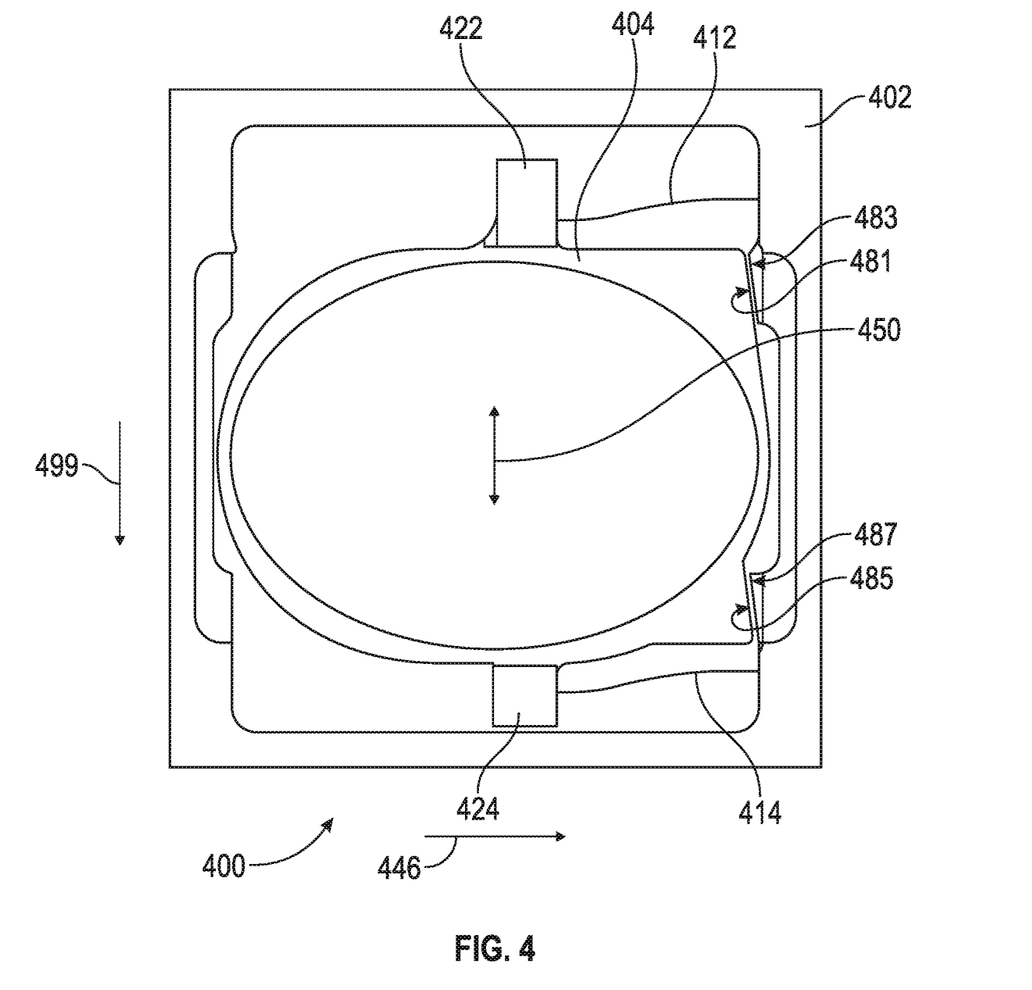
FIG. 4 illustrates a side view of a suspension assembly according to another aspect of the invention.

FIG. 4 illustrates a side view of a suspension assembly 400 according to another aspect of the invention to especially be able to handle undesired transverse 446 vibrations and shock waves. The suspension assembly 400 comprises a supporting frame 402 and a suspension frame 404. The suspension frame 404 is suspended in the supporting frame 402 by means of one or more suspension springs 412, 414. When the supporting frame 402 is aligned with gravity 499 the suspension frame 404 can move 450 relative to the supporting frame 402. The suspension frame 404 suitably has a neutral position within the restrictions of two stoppers 422, 424.

Ideally vibrations would only appear in the vertical direction. However vibrations and shock waves might also appear in a transverse direction 446, especially in harsh environments such as being mounted on a freight railway bearing. Any vibrations or shock waves in the transversal direction 446 are being restricted by a distance existing between the supporting frame 402 and the suspension frame 404. Bending stresses of the flexures 412, 414 will be increasing until the suspension frame 404 hits the supporting frame 402 on the flexure side.

Even though the distance might not be very big, if the shock waves and vibrations in the transverse direction 446 are large and frequent, they can cause severe damage to the suspension springs 412, 414 due to being subjected to large bending stresses. It is the purpose of this invention to prevent overstressing of the flexures or other equivalent mechanisms by means of limiting mechanical motion due to shock waves by stoppers on both the suspension frame 404 and the supporting frame 402 being formed such that a distance between the suspension frame 404 and the supporting frame 402 is made very small in a controlled manner over the operating range movement 450 of the suspension frame 404 in relation to the supporting frame 402. The stoppers should mate at least along the relative motion path between the suspension frame 404 and the supporting frame 402. The stoppers can be two mating surfaces, as in the embodiment according to FIG. 4. Alternatively a stopper on either the suspension frame 404 or the supporting frame 402 may be a surface and a mating stopper on the other frame may be one or more contact points, one or more contact areas where each area is smaller than the area of the mating stopper surface, or one or more contact line sections. The contact points, areas and line sections being protrusions. There is also the possibility of having one or more contact line sections as both mating stoppers, or contact line sections as one and one or more smaller contact areas as the other, or several smaller contact areas as both, or contact points as one and small contact areas as the other. There are many different ways this can be arranged, as long as over the operating range movement 450, there stoppers on both the suspension frame 404 and the supporting frame 402 are so arranged that there is always a mating surface, point or line section available.

The stopper surfaces 481, 483, 485, 487, in this embodiment sloped stopper surfaces, are also used during assembly of a suspension frame 404 in a supporting frame 402. The assembly of the suspension springs/flexures 412, 414, 315 as connection points between a suspension frame 404 and a supporting frame 402 is done with the aid of an assembly tool. The flexures 412, 414, 315 are in a straight position during assembly.

The assembly tool restrains the suspension frame 404 such that in relation to the supporting frame 402 it can only move in the transverse direction 446. Suitably shims are used between the mating sloped stopper surfaces 481, 483, 485, 487 to be able to attain a desired small distance between the mating sloped surfaces 481, 483, 485, 487 when in use. With shims between the mating sloped stopper surfaces 481, 483, 485, 487 the suspension frame 104 is moved in the transverse direction 446 towards the sloping stopper surfaces 483, 487 of the supporting frame 402. The suspension springs/flexures 412, 414, 315 are then fastened to the supporting frame 401 and the suspension frame 404.

Figure 5:
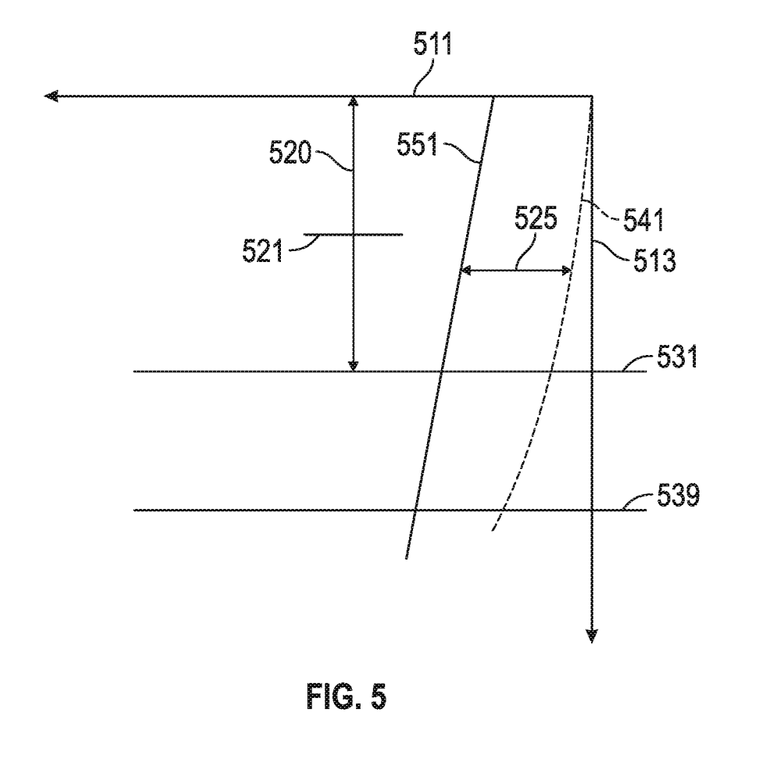
FIG. 5 illustrates a graph showing the influence of the movement of the suspension frame in relation to the support frame in view of the sloped stopper surfaces.

FIG. 5 illustrates a graph showing the influence of the movement of the suspension frame in relation to the support frame in view of the sloped stopper surfaces. One or more flexures, two according to the embodiment of FIG. 4, allows a suspension frame to move in relation to a supporting frame and dictating the kinematics. The kinematics describe a motion path that the supporting frame will follow in relation to the supporting frame and is prescribed by the one or more flexures.

Referring to both FIG. 4 and FIG. 5, the negative y-axis 513 represents an offset vertical movement 450 of the suspension frame 404 over its operating range 520, with an indicated suitable balance position 521 of the suspension frame 404. The negative x-axis 511 represents an offset transversal 446 distance between the suspension frame 404 and the supporting frame 402.

When the suspension frame 404 moves 450 up and down, the suspension frame 404 does not move in a straight line, but a slightly curved line 541. This is the result of the so-called parasitic motion that is due to the flexures 412, 414 bending. The flexures' 412, 414 connection points with the suspension frame 404 will follow a motion path being a slightly bent curve, see 541 in FIG. 5. This would result in a gap between the suspension frame 404 and the supporting frame 402 to vary. According to this other aspect of the invention, the surfaces 481, 483, 485, 487 between the suspension frame 404 and the supporting frame 402 that are closest to each other, have linear matching slopes 551 on both sides. The linear slope is such that over the operating range 520 of the suspension frame, the gap 525 between mating surfaces 481 485 of the suspension frame 404 and the mating surfaces 483, 487 of the supporting frame 402 is fairly constant, varying very little.

This results in several advantages. The gap distance between the mating surfaces 481, 483, 485, 487 can be properly controlled and made to be extremely small. This leads to lower stresses of the flexures 412, 414 when there are vibrations or shock waves in the transversal direction 446. This will give the flexures 412, 414 a longer lifetime.

Figure 6A:
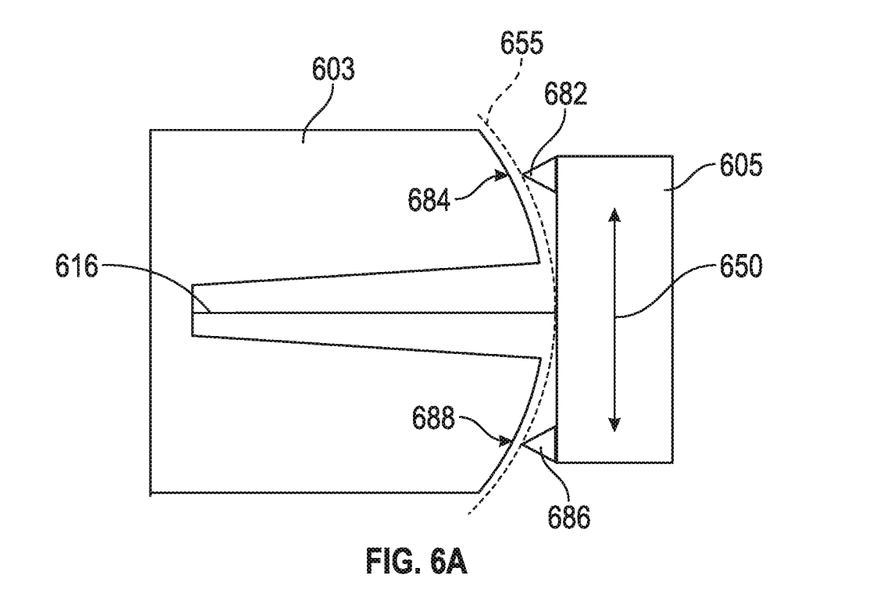
FIG. 6A-6B illustrate a side view of a further embodiment of a suspension assembly comprising stoppers according to the invention.

FIG. 6A illustrates a side view of a further embodiment of a suspension assembly in a relaxed state with one flexure 616 and comprising stoppers 682, 684, 686, 688 according to the invention. A supporting frame 603 is coupled to a suspension frame 605 via one flexure 616. During undisturbed movement 650, the contact points of the stoppers 682, 686 of the suspension frame 605 follow a movement path 655 that is in principle equidistant to the curved stoppers 684, 688 of the supporting frame 603 during undisturbed movement over the operating range movement 650. The range of movement is in most embodiments also defined/restricted by stoppers (not shown).

Figure 6B:
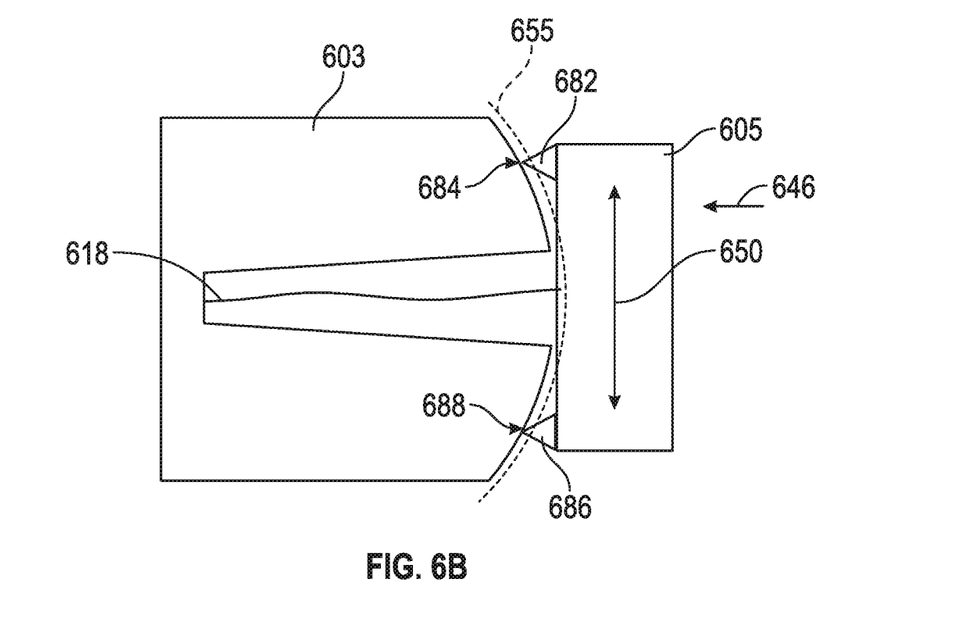

FIG. 6B illustrates a side view of the suspension assembly of FIG. 6A, but in a state influenced by for example a shock wave in a transverse direction 646 to the suspension frame's undisturbed direction of movement 650. It can be clearly seen that the flexure 618 is in a buckled state and that the mating stoppers 682, 684, 686, 688 are touching. This limits the buckling of the flexure to that which is illustrated.

Figure 7:
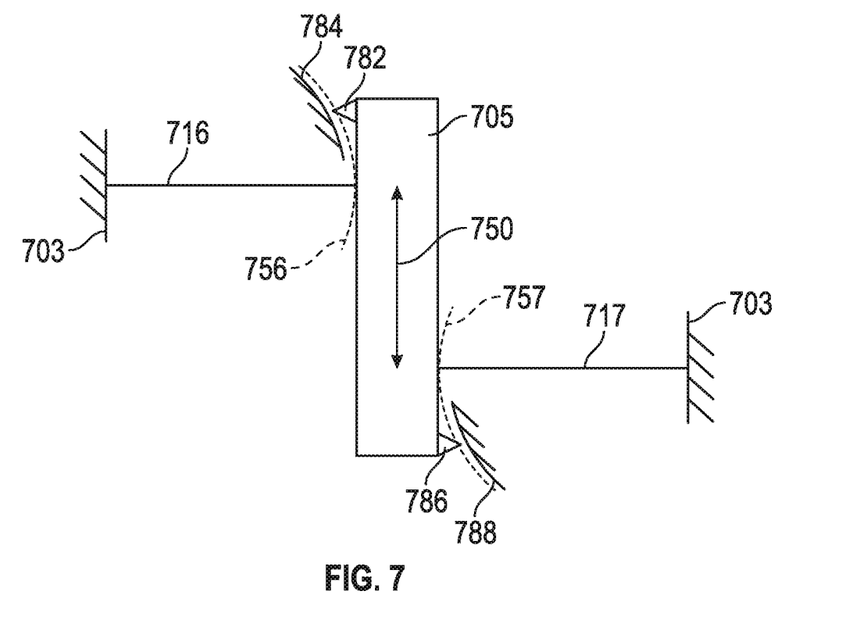
FIG. 7 illustrates a schematic side view of a still further embodiment of a suspension assembly comprising stoppers according to the invention.

FIG. 7 illustrates a schematic side view of a still further embodiment of a suspension assembly comprising two flexures 716, 717, and stoppers 782, 784, 786, 788 according to the invention. In this embodiment, a flexure 716, 717 is placed on each side of a suspension frame 705, the flexures being displaced in relation to each other. A supporting frame 703 is only schematically represented together with its bent stopper surfaces 784, 788. The stopper surfaces of the supporting frame 703 are bent in such a way as to be at an equidistance to an undisturbed path of movement of the contact points of the stoppers 782, 786 of the suspension frame 705. Movement 750 of the suspension frame will not be in a straight line, even when undisturbed, but will tilt around the rest position according to the kinematics of the flexures resulting in a combination of travelling paths 756 and 757.

Figure 8:
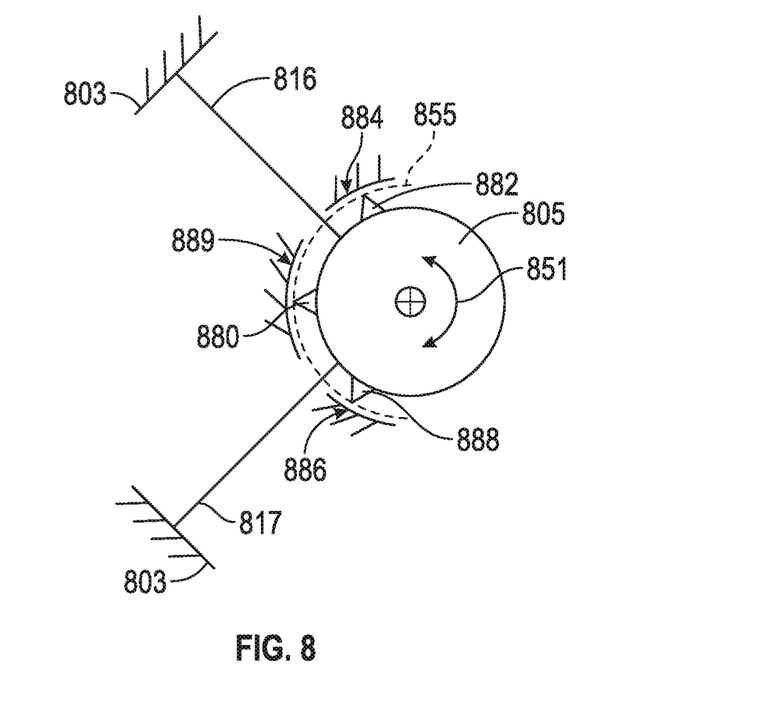
FIG. 8 illustrates a schematic side view of a further embodiment of a suspension assembly according to the invention.

FIG. 8 illustrates a schematic side view of a further embodiment of a suspension assembly according to the invention, also in its basic form comprising two flexures 816, 817. These flexures 816, 817 are coupled to a suspension frame 805 at 90 degrees to each other creating a basic circular movement 851. As in FIG. 7, a supporting frame 803 is only schematically represented together with its bent stopper surfaces 884, 886, 889. The stopper surfaces of the supporting frame 803 are bent in such a way as to be at an equidistance to an undisturbed path of movement 855 of the contact points of the stoppers 880, 882, 888 of the suspension frame 805. Movement 851 of the suspension frame will not be only rotational, even when undisturbed, but will also displace a little.

As mentioned above, the stoppers can take on many different forms. The stoppers can be two mating surfaces, slanted or curved. Alternatively the mating stoppers can each be taken from a larger surface, one or more contact points, one or more contact areas where each area being smaller than an area of larger surface, or one or more contact line sections. Most attention will probably have to be given to the distribution and number of contact points if both of the mating surfaces are using them. The contact points, areas and line sections are protrusions.

The invention is based on the basic inventive idea of including one or more stoppers on both the suspension frame and the supporting frame such that they pairwise mate and that they are designed the way, that a defined movement of the suspension frame in relation to the supporting frame is enabled under normal vibration conditions of the operating range, but that this movement is limited in case of excessive, extreme and/or shock-load-like vibration conditions. The invention is not restricted to the above-described embodiments but may be varied within the scope of the following claims.

LISTING OF REFERENCE ELEMENTS

FIG. 1 illustrates an isometric view of a suspension assembly where flexures/springs according to a further aspect of the invention are suitably mounted as suspension springs:
    100 Suspension assembly,
    102 Supporting frame,
    104 Suspension frame,
    112 First suspension spring,
    114 Second suspension spring,
    122 Upper stopper,
    124 Lower stopper,
    142 Vertical direction
    144 Longitudinal direction
    146 Transverse direction
    150 Direction of suspension frame movement,
    199 Gravity FIG. 2 illustrates an isometric view of a flexure/spring:
    212 Flexure/spring,
    232 Connection/clamping area to a suspension frame,
    234 Flexure/spring area,
    238 Connection/clamping area to a supporting frame,
    244 Longitudinal direction,
    250 Flexure/spring and a connected suspension frame direction of movement when in use,
    262 Thickness of Flexure/spring,
    264 Length of flexure/spring area,
    265 Width of flexure/spring area,
    272 Flexure/spring area border to connection/clamping area of a suspension frame,
    278 Flexure/spring area border to connection/clamping area of a supporting frame.

FIG. 3 illustrates an isometric view of a flexure/spring according to a further aspect of the invention:
    315 Flexure/spring according to the invention,
    317 First slot,
    318 Second slot,
    332 Connection/clamping area to a suspension frame,
    335 First flexure/spring area,
    336 Second flexure/spring area,
    337 Third flexure/spring area,
    338 Connection/clamping area to a supporting frame,
    344 Longitudinal direction,
    350 Flexure/spring and a connected suspension frame direction of movement when in use,
    362 Thickness of Flexure/spring,
    364 Length of flexure/spring areas,
    366 Width of the first flexure/spring area,
    367 Width of the second flexure/spring area,
    368 Width of the third flexure/spring area,
    369 Width of the slots between the flexure/spring areas,
    372 Flexure/spring areas border to connection/clamping area of a suspension frame,
    378 Flexure/spring areas border to connection/clamping area of a supporting frame.

FIG. 4 illustrates a side view of a first embodiment of a suspension assembly according to the invention:
    400 Suspension assembly,
    402 Support frame,
    404 Suspension frame
    412 First suspension spring,
    414 Second suspension spring,
    422 Upper stopper,
    424 Lower stopper,
    446 Transverse direction,
    450 Flexure/springs and the connected suspension frame direction of movement when in use,
    481 First sloped stopper surface on the suspension frame,
    483 First sloped stopper surface on the support frame mating with the first sloped stopper surface on the suspension frame,
    485 Second sloped stopper surface on the suspension frame,
    487 Second sloped stopper surface on the support frame mating with the second sloped stopper surface on the suspension frame,
    499 Gravity.

FIG. 5 illustrates a graph showing the influence of the movement of the suspension frame in relation to the support frame in view of the sloped stopper surfaces:

511 An offset transverse distance between the support frame and the suspension frame,
513 An offset vertical distance between the support frame and the suspension frame,
520 Working range of the suspension frame,
521 Midpoint of working range,
525 Gap distance between the sloped stopper surfaces of the on the suspension frame and the sloped stopper surfaces of the support frame,
531 Working range limit,
539 Suitable distance/place of the lower stopper,
541 Parasitic movement of the suspension frame,
551 Slope of sloped surfaces.

FIGS. 6A & 6B illustrate a side view of a further embodiment of a suspension assembly comprising stoppers according to the invention:

603 Supporting frame,
605 Suspension frame,
616 First suspension spring in a relaxed state,
618 First suspension spring in a buckled state,
650 Direction of suspension frame movement,
646 Direction of force on the suspension frame, transverse direction to the suspension frame's undisturbed direction of movement,
655 Travelling path of the stopper interfaces of the suspension frame as the suspension frame moves undisturbed,
682 First stopper and stopper interface of the suspension frame,
684 First stopper interface surface of the supporting frame,
686 Second stopper and stopper interface of the suspension frame,
688 Second stopper interface surface of the supporting frame.

FIG. 7 illustrates a schematic side view of a still further embodiment of a suspension assembly comprising stoppers according to the invention:

703 Supporting frame,
705 Suspension frame,
716 First suspension spring in a relaxed state,
717 second suspension spring in a relaxed state,
750 Direction of suspension frame movement,
756 Travelling path of the stopper interfaces of the suspension frame as the suspension frame moves undisturbed,
757 Travelling path of the stopper interfaces of the suspension frame as the suspension frame moves undisturbed,
782 First stopper and stopper interface of the suspension frame,
784 First stopper interface surface of the supporting frame,
786 Second stopper and stopper interface of the suspension frame,
788 Second stopper interface surface of the supporting frame.

FIG. 8 illustrates a schematic side view of a further embodiment of a suspension assembly according to the invention:

803 Supporting frame,
805 Suspension frame,
816 First suspension spring in a relaxed state,
817 Second suspension spring in a relaxed state,
851 Direction of suspension frame movement,
855 Travelling path of the stopper interfaces of the suspension frame as the suspension frame moves undisturbed,
880 Optional stopper and stopper interface of the suspension frame,
882 First stopper and stopper interface of the suspension frame,
884 First stopper interface surface of the supporting frame,
886 Second stopper and stopper interface of the suspension frame,
888 Second stopper interface surface of the supporting frame.
889 Optional stopper interface surface of the supporting frame.

The invention claimed is:

1. A suspension assembly comprising:
a suspension frame;
a supporting frame defining a vertical direction, a transverse direction, and a longitudinal direction, the suspension frame being movably coupled to the supporting frame such that the suspension frame can move in the vertical direction within the supporting frame in response to vibrations;
the suspension assembly further comprises a first flexure and a second flexure that link the suspension frame to the supporting frame, when viewing the suspension assembly in cross section, as taken perpendicular to the longitudinal direction, the first flexure extends between a first side of the suspension frame and a side of the supporting frame such that the first flexure extends in the transverse direction and the second flexure extends between a second side, opposite to the first side, of the suspension frame and the side of the supporting frame such that the second flexure extends in the transverse direction, the first flexure being vertically aligned with and spaced from the second flexure, the first flexure and the second flexure being configured to reduce movement of the suspension frame that is not in the vertical direction; and
the side of the supporting frame defining a first sloped frame stopper surface which is askew to the vertical direction and which is positioned between the first flexure and the second flexure, the suspension frame defining a first sloped suspension stopper surface which faces the first sloped frame stopper surface.

2. The suspension assembly according to claim 1, wherein at rest there is play between the supporting frame and the suspension frame to enable relative movement of the supporting frame and the suspension frame with respect to each other, the first sloped frame stopper surface and the first sloped suspension stopper surface having a common vertical slope such that depending on the relative position of the suspension frame to the supporting frame, the first sloped frame stopper surface and the first sloped suspension stopper surface are parallel.

3. The suspension assembly according to claim 1, wherein the first flexure is a first ortho-planar spring and the second flexure is a second ortho-planar spring, when viewing the suspension assembly in cross section as taken perpendicular to the longitudinal direction the first flexure and the second flexure only connect to the side of the supporting frame such that the first flexure connects only at a single location on the supporting frame and the second flexure only connects at another single location on the supporting frame.

4. The suspension assembly according to claim 1, wherein the first flexure and the second flexure each comprise at least one slot in a longitudinal direction thereof.

5. The suspension assembly according to claim 4, wherein the first flexure and the second flexure each comprise two or more parallel slots in the longitudinal direction thereof.

6. The suspension assembly according to claim 1, the side of the supporting frame defining a second sloped frame stopper surface which is askew to the vertical direction and which is positioned between the first flexure and the second flexure, the suspension frame defining a second sloped suspension stopper surface which faces the second sloped frame stopper surface.

7. The suspension assembly according to claim 6, the second sloped frame stopper surface and the second sloped suspension stopper surface having a same vertical slope such that depending on the relative position of the suspension frame to the supporting frame, the second sloped frame stopper surface and the second sloped suspension stopper surface are parallel.

8. The suspension assembly according to claim 1, wherein the first flexure and the second flexure each comprise an ortho-planar spring, the first sloped frame stopper surface and the first sloped suspension stopper surface having a common vertical slope such that depending on the relative position of the suspension frame to the supporting frame, the first sloped frame stopper surface and the first sloped suspension stopper surface are parallel, the side of the supporting frame defining a second sloped frame stopper surface which is askew to the vertical direction and which is positioned between the first flexure and the second flexure, the suspension frame defining a second sloped suspension stopper surface which faces the second sloped frame stopper surface, the second sloped frame stopper surface and the second sloped suspension stopper surface having a same vertical slope such that depending on the relative position of the suspension frame to the supporting frame, the second sloped frame stopper surface and the second sloped suspension stopper surface are parallel, the first sloped frame stopper surface and the second sloped frame stopper surface being configured to abut the first sloped suspension stopper surface and the second sloped suspension stopper surface, respectively, when shock transmitted from the suspension frame to the supporting exceeds a predetermined amount to reduce the wear of the first flexure and the second flexure.

9. The suspension assembly according to claim 1, wherein the first sloped frame stopper surface is configured to abut the first sloped suspension stopper surface when a force transmitted from the suspension frame to the supporting frame exceeds a predetermined amount to reduce the wear of the first flexure and the second flexure.

* * * * *